United States Patent
Guo et al.

(10) Patent No.: US 11,353,706 B2
(45) Date of Patent: Jun. 7, 2022

(54) AUGMENTED REALITY DISPLAY DEVICE AND PAIR OF AUGMENTED REALITY GLASSES

(71) Applicant: BOE TECHNOLOGY GROUP CO., LTD., Beijing (CN)

(72) Inventors: Yujiao Guo, Beijing (CN); Wei Wang, Beijing (CN); Gaolei Xue, Beijing (CN); Xianqin Meng, Beijing (CN); Xiandong Meng, Beijing (CN); Pengxia Liang, Beijing (CN); Fangzhou Wang, Beijing (CN); Qiuyu Ling, Beijing (CN); Meng Yan, Beijing (CN); Peilin Liu, Beijing (CN); Yishan Tian, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 85 days.

(21) Appl. No.: 16/957,361

(22) PCT Filed: Feb. 18, 2020

(86) PCT No.: PCT/CN2020/075725
§ 371 (c)(1),
(2) Date: Jun. 23, 2020

(87) PCT Pub. No.: WO2020/173342
PCT Pub. Date: Sep. 3, 2020

(65) Prior Publication Data
US 2021/0364799 A1    Nov. 25, 2021

(30) Foreign Application Priority Data

Feb. 26, 2019 (CN) .......................... 201910142011.6

(51) Int. Cl.
*G02B 27/01* (2006.01)
*G02B 27/10* (2006.01)
*G06T 19/00* (2011.01)

(52) U.S. Cl.
CPC ..... *G02B 27/0172* (2013.01); *G02B 27/0101* (2013.01); *G02B 27/1013* (2013.01);
(Continued)

(58) Field of Classification Search
CPC ............ G02B 27/0172; G02B 27/0101; G02B 27/1013; G02B 2027/011;
(Continued)

(56) References Cited

U.S. PATENT DOCUMENTS

| 10,001,649 B2 | 6/2018 | Jin |
| 2013/0016410 A1 | 1/2013 | Futterer |

(Continued)

FOREIGN PATENT DOCUMENTS

| CN | 103631009 A | 3/2014 |
| CN | 203930226 U | * 11/2014 |

(Continued)

OTHER PUBLICATIONS

State Intellectual Property Office of the People's Republic of China, Office Action and Search Report Issued in Application No. 201910142011.6, dated Mar. 13, 2020, 17 pages. (Submitted with Partial Translation).

(Continued)

*Primary Examiner* — Brent D Castiaux
(74) *Attorney, Agent, or Firm* — McCoy Russell LLP

(57) ABSTRACT

An augmented reality display device and a pair of augmented reality glasses are provided. The augmented reality display device includes a substrate, an imaging element and a first optical element. The substrate includes a first side and a second side opposite to each other. The imaging element is configured to display a primary virtual image formed by virtual image light. The first optical element is configured to receive the virtual image light, orient the virtual image light to magnify the primary virtual image into a secondary virtual image, and make the virtual image light exit from the first optical element in a direction from the second side to the first side.

20 Claims, 9 Drawing Sheets

(52) U.S. Cl.
CPC ...... *G06T 19/006* (2013.01); *G02B 2027/011* (2013.01); *G02B 2027/0112* (2013.01); *G02B 2027/0174* (2013.01)

(58) Field of Classification Search
CPC .... G02B 2027/0112; G02B 2027/0174; G02B 3/00; G02B 1/007; G06T 19/006
See application file for complete search history.

(56) References Cited

U.S. PATENT DOCUMENTS

| | | | |
|---|---|---|---|
| 2015/0023051 A1 | 1/2015 | Jepsen et al. | |
| 2017/0357091 A1 | 12/2017 | Jin | |
| 2018/0039052 A1* | 2/2018 | Khan | G02B 27/283 |
| 2018/0052276 A1* | 2/2018 | Klienman | G02B 5/3025 |

FOREIGN PATENT DOCUMENTS

| | | | |
|---|---|---|---|
| CN | 203930226 U | | 11/2014 |
| CN | 105393295 A | | 3/2016 |
| CN | 106097899 A | | 11/2016 |
| CN | 106873160 A | | 6/2017 |
| CN | 106873161 A | * | 6/2017 |
| CN | 106873161 A | * | 6/2017 |
| CN | 106940478 A | * | 7/2017 |
| CN | 106940478 A | * | 7/2017 |
| CN | 206671688 U | | 11/2017 |
| CN | 107561723 A | | 1/2018 |
| CN | 108428716 A | | 8/2018 |
| CN | 108957757 A | | 12/2018 |
| CN | 109709675 A | | 5/2019 |

OTHER PUBLICATIONS

ISA China National Intellectual Property Administration, International Search Report Issued in Application No. PCT/CN2020/075725, dated Apr. 27, 2020, WIPO, 17 pages. (Submitted with Partial Translation).

* cited by examiner

AUGMENTED REALITY DISPLAY DEVICE AND PAIR OF AUGMENTED REALITY GLASSES

CROSS-REFERENCE TO RELATED APPLICATIONS

The present application is a U.S. national phase application of International Application No. PCT/CN2020/075725 filed on Feb. 18, 2020, which claims a priority to Chinese Patent Application No. 201910142011.6 filed on Feb. 26, 2019. The entire contents of each of the above-listed applications are hereby incorporated by reference for all purposes.

TECHNICAL FIELD

The present disclosure relates to the field of augmented reality display technology, and in particular to an augmented reality display device and a pair of augmented reality glasses.

BACKGROUND AND SUMMARY

Augmented reality technology can realize the superposition of real environment and virtual environment. An augmented reality display device in the related technology has disadvantages such as low utilization rate of light energy, large volume, complicated manufacturing process and high cost.

According to an aspect of the present disclosure, an augmented reality display device is provided, which includes a substrate, an imaging element and a first optical element. The substrate includes a first side and a second side opposite to each other. The imaging element is configured to display a primary virtual image formed by virtual image light. The first optical element is configured to receive the virtual image light, orient the virtual image light to magnify the primary virtual image into a secondary virtual image, and make the virtual image light exit from the first optical element in a direction from the second side to the first side.

In some embodiments, the augmented reality display device further includes a second optical element, where the second optical element is on the second side of the substrate, the imaging element and the first optical element are located on a same side of the second optical element, and the second optical element is configured to correct ambient light transmitted through the first optical element in a direction from the second side to the first side.

In some embodiments, the first optical element is located on the first side of the substrate, and the imaging element is located on the second side of the substrate, and is closer to the substrate than the second optical element. The first optical element is a convex lens or a converging metalens, and the second optical element is a concave lens or a diverging metalens.

In some embodiments, the imaging element is located on the first side of the substrate, the first optical element is located on the second side of the substrate, and is closer to the substrate than the second optical element. The first optical element is a concave transflective lens including a concave reflective surface that faces the imaging element or a diverging metalens including a reflective surface that faces the imaging element, and the second optical element is a convex lens or a converging metalens.

In some embodiments, the augmented reality display device further includes a third optical element on a second side of the substrate, where the imaging element and the first optical element are on the first side of the substrate, the imaging element is closer to the substrate than the first optical element, and the third optical element is closer to the substrate than the second optical element. The first optical element is a convex lens or a converging metalens, the second optical element is a concave lens or a diverging metalens, and the third optical element includes a reflective surface facing the imaging element.

In some embodiments, the augmented reality display device further includes a third optical element on the first side of the substrate, where the imaging element and the first optical element are on the second side of the substrate, the imaging element is closer to the substrate than the first optical element, and the first optical element is closer to the substrate than the second optical element. The first optical element is a concave transflective lens including a concave reflective surface or a diverging metalens including a reflective surface, the second optical element is a convex lens or a converging metalens, and the third optical element includes a reflective surface facing the imaging element.

In some embodiments, gaps are between a plurality of imaging elements, and each of the gaps is configured to enable ambient light to pass through.

In some embodiments, an optical axis of each of a plurality of first optical elements passes through a geometric center of a primary virtual image formed by a corresponding one of a plurality of imaging elements.

In some embodiments, the substrate is a curved substrate, a plurality of first optical elements are spaced apart from each other on the curved substrate, and the curved substrate is configured to adjust light-exiting angles of the plurality of first optical elements to converge a plurality of secondary virtual images.

In some embodiments, the substrate is a curved substrate, a plurality of first optical elements are connected to form a first optical layer, and the first optical layer includes a free-form-surface lens.

In some embodiments, the substrate is a planar substrate, a plurality of first optical elements are spaced apart from each other on the planar substrate, the augmented reality display device further includes a volume holographic grating, and the volume holographic grating is located on a side of the first optical element away from the substrate.

In some embodiments, the volume holographic gating includes a plurality of sub-gratings, an optical axis of each of the plurality of sub-gratings coincides with an optical axis of a corresponding one of the plurality of first optical elements, and the volume holographic grating is configured to converge a plurality of secondary virtual images.

In some embodiments, the substrate is a planar substrate, a plurality of first optical elements are connected to form a first optical layer, and the first optical layer includes a holographic lens.

In some embodiments, the imaging element is a pixel island, the pixel island includes a plurality of pixels, and the pixel islands are arranged at intervals on the substrate.

In some embodiments, the pixel island includes a plurality of pixels of different colors.

In some embodiments, a plurality of secondary virtual images respectively emitted by the plurality of pixel islands are spliced into a complete virtual image.

In some embodiments, the pixel island includes a plurality of pixels of a same color.

In some embodiments, secondary virtual images formed by the adjacent pixel islands with different pixel colors at least partially overlap.

In some embodiments, secondary virtual images of a same color emitted by the pixel islands of a same color are spliced to each other, and secondary virtual images of different colors emitted by the pixel islands of different colors are superposed to form a complete virtual image.

According to an aspect of the present disclosure, a pair of augmented reality glasses is provided, which includes the augmented reality display device according to any embodiment of the present disclosure.

BRIEF DESCRIPTION OF THE DRAWINGS

Embodiments of the present disclosure are described in more detail with reference to drawings and by way of non-restrictive examples, in the drawings.

DETAILED DESCRIPTION

Augmented Reality (AR) is a technology that combines a virtual environment with a real environment based on computer processing and by means of perspective displays or glasses. In the AR technology, the real environment and the virtual environment are superposed in real-time so as to enable real-world information and virtual-world information to be complemented with each other. The AR enables users to be personally on the scene or feel immersive, and to interact with the environment.

In the related technologies, there are mainly two schemes to realize AR. One scheme is a spectroscopic prism-based scheme. In this scheme, an imaging optical path, a beam splitting path and a beam converging path are realized by a polarized beam-splitting prism. The polarized beam-splitting prism reflects information projected by a micro-display to the human eye through a polarized beam-splitting film, while allowing the natural light to transmit into the human eye. However, the size of the polarized beam-splitting prism is very large, which is not conducive to making the display device light and thin. Moreover, the area of a display area of the polarized beam-splitting prism is small. In addition, an incidence angle of the projection light is also limited by the polarized beam-splitting prism, which limits the view angle of AR display. The resolution of a virtual image presented by a display device with a beam-splitting prism for human eyes is poor. The other scheme is optical waveguide transmission-based scheme. In this scheme, the light carrying image information is incident on the side, the light is transmitted with total reflection in a waveguide, and the light is coupled from the display panel to the human eye by using a plurality of diffractive optical elements. When the light is transmitted in the waveguide, the light may uncontrollably contact the diffractive optical element many times, and the light loss in a light-coupling entrance and the light loss in a light-coupling exit of the waveguide are large, so the utilization rate of the light energy is low. At present, the utilization rate of light energy of this kind of display device is only about 2%, which puts a high requirement on luminous brightness of the display panel. The optical waveguide transmission scheme also has problems of poor color effect, poor definition, and complicated structure, which is not good to miniaturization.

Figure 1A:
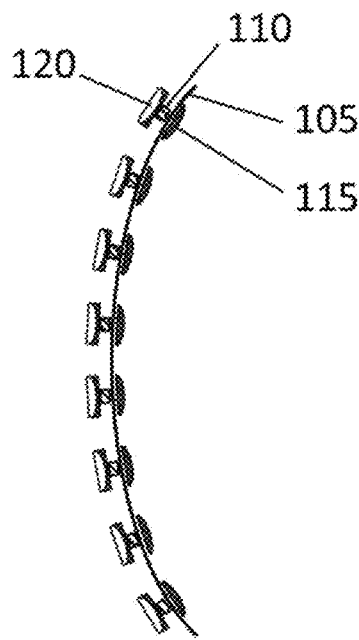
FIG. 1A schematically illustrates a side view of an augmented reality display device according to an embodiment of the present disclosure.
Figure 1B:
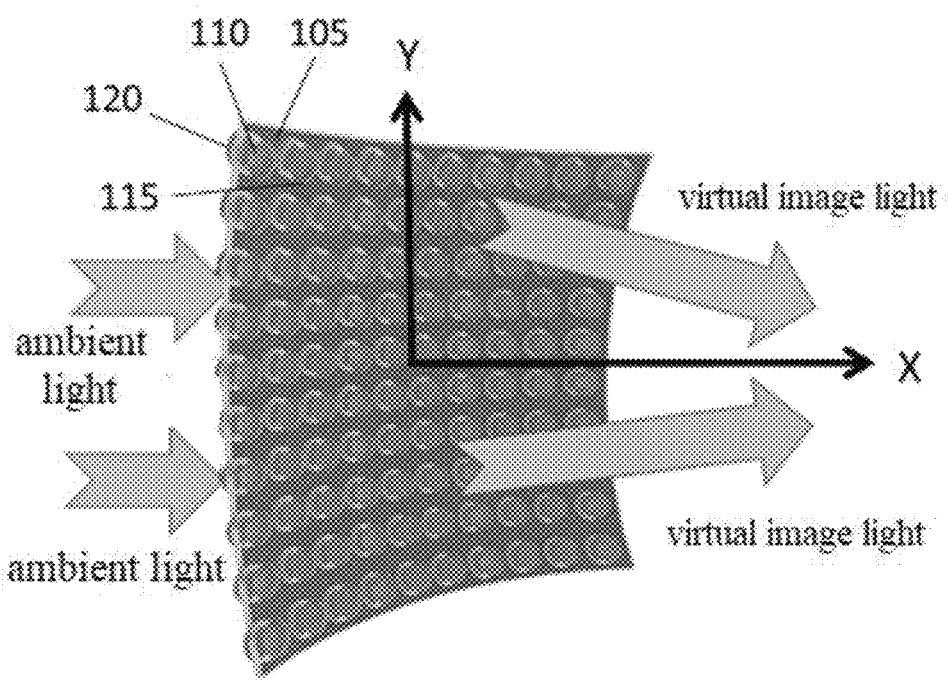
FIG. 1B schematically illustrates a perspective view of an augmented reality display device according to an embodiment of the present disclosure.

The present disclosure provides an augmented reality display device. FIG. 1A schematically illustrates a side view of an augmented reality display device according to an embodiment of the present disclosure. FIG. 1B schematically illustrates a perspective view of an augmented reality display device according to an embodiment of the present disclosure. As shown in FIG. 1A and FIG. 1B, the augmented reality display device includes a substrate 105, an imaging element 110, and a first optical element 115 stacked in a direction. The substrate 105 may be planar or curved, and the drawings show only an example of a curved surface, which is not limited in the present application. When the term "stacked in a direction" is used to qualify three elements, the term may be understood as that one of the three elements includes two sides opposite to each other and the other two elements of the three elements are disposed on the two sides, respectively. In addition, the term does not limit the arrangement order of the plurality of elements described by the term. For example, in some embodiments, the substrate may be between the imaging element and the first optical element, and in other embodiments, the imaging element may be between the substrate and the first optical element. The imaging element 110 is located on a side of the substrate 105 and is configured to generate virtual image light. The virtual image light is projected to the first optical element 115, and is projected to human eyes through the first optical element 115. A primary virtual image is formed when the virtual image light emitted by the imaging element does not reached the first optical element 115. After the primary virtual image is magnified by the first optical element, a secondary virtual image to be combined with an environmental image can be formed. After passing through the first optical element 115, the virtual image light is oriented so that the primary virtual image is amplified to form a secondary virtual image. The term "oriented" represents that a direction of light propagation is guided and changed, which causes images formed by these light to be magnified or reduced after the light is directed. As a virtual image, the secondary virtual image is perceived by the human eyes. The secondary virtual image is magnified relative to the primary virtual image. Specifically, a magnification factor of the secondary virtual image relative to the primary virtual image may be set by setting a focal length of the first optical element, according to a formula of the magnification factor of the lens $$T = \frac{\tan w_{secondary}}{\tan w_{primary}} = \frac{250}{f},$$

where $w_{secondary}$ represents a view angle of the secondary virtual image relative to the human eye, $w_{primary}$ represents a view angle of the primary virtual image relative to the human eye, and f represents the focal length of the first optical element. In FIG. 1B, x direction represents a direction from the center of the augmented reality display device to the human eye, and y direction represents the vertical direction. In some embodiments, as shown in FIG. 1B, the plurality of imaging elements 110 may be disposed on a surface of the substrate 105 in the form of a rectangular array.

To avoid fatigue due to long-term viewing of the human eyes, the position of the magnified virtual image may be set, for example, at a visible distance L=250 mm of the human eye, by adjusting properties of the imaging element 110 and the first optical element 115 and a distance therebetween (for example, a thickness of the substrate 105). The distance between the imaging element and the first optical element may be set according to the object image relationship formula $$\frac{1}{l'} = \frac{1}{l} = \frac{1}{f'},$$

where l' represents an object distance, that is, a distance between the primary virtual image and the first optical element, which is also the distance between the imaging element and the first optical element; l represents an image distance, that is, a distance between the secondary virtual image and the first optical element, which may be the above-mentioned visible distance; and f' represents the focal length of the first imaging element. In some embodiments, the first optical element 115 is a convex lens, which has properties such as focal length, refractive index, incidence surface, curvature radius of a light-exiting surface, and thickness. In some embodiments, the first optical element is a concave transflective lens, which has properties such as focal length, curvature radius of a reflective surface. In some embodiments, the first optical element 115 is a metalens, which has properties such as focal length and refractive index. The term "visible distance" refers to a distance between a relatively small object and a normal human eye that is most suitable for viewing, which is about 250 mm. When an object or an image is in the visible distance, the image can be clearly seen or viewed by the human eye without adjusting it. If the view angle of the complete virtual image is A, and local virtual images formed by respective imaging elements are spliced into the complete virtual image without overlapping, the view angle covered by each imaging element is A/n, and n is the number of imaging elements, that is, the complete virtual image is divided into n local virtual images. For a single first optical element, the number n of the first imaging elements may be obtained according to a relative aperture when the imaging quality is optimal. In addition, it is known that in order to make the human eye impossible to distinguish a single pixel, a pixel density of the virtual image as presented needs to be designed in a manner that a distance between two points corresponding to two adjacent pixel points on the retina is smaller than a diameter 0.006 mm of two visual nerve cells on the macula. Thus, the size of each pixel may be calculated in combination with the magnification factor of the pixel. For example, in a case that the human eye is 15 mm away from a substrate of a display device, the size of the pixel should not exceed 4.36 μm. In this case, according to the number n of pixel islands, the size of a single pixel island may be determined, and thus the focal length f of the single first optical element may be calculated. Since the distance d between the imaging element and the first optical element approaches the focal length in a case that d is less than the focal length (for example, 0.9f≤d<f), the distance d between the imaging element and the first optical element can be obtained. In a case that the imaging element and the first optical element are disposed on both sides of the substrate, the thickness of the substrate is equal to the distance d between the imaging element and the first optical element.

In some embodiments, the augmented reality display device may include a plurality of imaging elements 110 and a plurality of first optical elements 115. In the process of fabricating the display device, a film including the plurality of first optical elements may be first formed, and then the film is arranged (for example, attached) on the substrate. The size of the imaging element 115 may be set small enough to make the human eye indistinguishable, so that that it does not affect the normal viewing of the external environment by the human eye (receiving ambient light). For example, a width of the imaging element 110 may be smaller than 1 micrometer. There is a large enough gap between the imaging elements 115 to allow ambient light to pass through the gap and enter the human eye through the gap. Each imaging element 110 displays a local virtual image (i.e., a primary virtual image). After being magnified, all the local virtual images may be spliced into a complete virtual image. The imaging element 110 and the first optical element 115 are in one-to-one correspondence. In some embodiments, a plane where the primary virtual image formed by each imaging element 110 is located is perpendicular to an optical axis of the corresponding first optical element 115, and is parallel to a focal plane of the first optical element 115. In a more specific embodiment, the optical axis of the first optical element 115 passes through the geometric center of the primary virtual image, so that the secondary virtual image formed through the first optical element 115 has as little distortion as possible relative to the primary virtual image. The brightness of each imaging element 110 may be adjusted according to a proper pixel rendering algorithm to fuse with ambient light, thus the influence of the imaging element 110 on the observation of the external environment may be negligible. In addition, according to the formula of the minimum resolution angle of the human eye $$\theta = \frac{1.22\lambda}{D}$$

(D is the pupil diameter) and $$\theta = \frac{S}{L}$$

(S is the size of a pixel, and L is an optical distance from the human eye to the imaging element), the maximum pixel size that makes the influence of the imaging element on the external environment negligible can also be obtained.

In some embodiments, the imaging element 110 may be a pixel island. The pixel island includes multiple pixels, corresponding to a pixel cluster. Each pixel is controlled by a drive circuit. The pixel islands are spaced apart from each other on the substrate 105. Each pixel island corresponds to a tiny display that displays a local virtual image. The virtual image light emitted by each pixel island passes through the first optical element 115 to form a local virtual image (that is, a secondary virtual image). By setting parameters such as the size of the pixel island, optical properties of the first optical element 115, a relative position between the pixel island and the first optical element 115, and a distance from the augmented reality display device to the human eye, local virtual images formed by all the pixel islands can be spliced together to form a complete virtual image. The light intensity of each pixel island can be controlled based on the pixel rendering algorithm, so that light beams emitted by the pixel islands are fused with the ambient light, and the existence of the pixel island does not affect the observation of the ambient light.

Figure 2A:
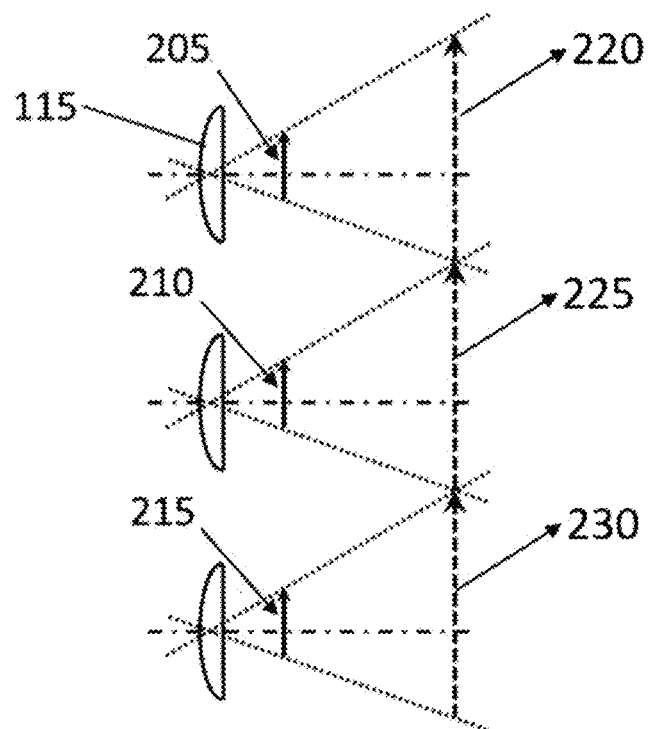
FIG. 2A schematically illustrates a splicing principle of virtual images of an augmented reality display device according to an embodiment of the present disclosure.
Figure 2B:
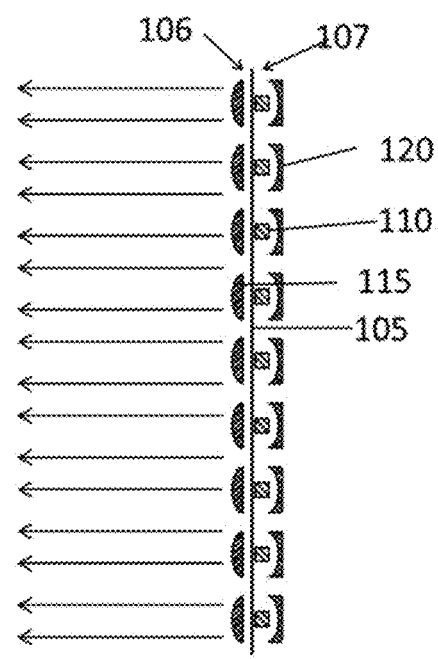
FIG. 2B schematically illustrates an optical path diagram of virtual image light emitted by an augmented reality display device according to an embodiment of the present disclosure.

A pixel island may include pixels having multiple colors, or may contain pixels having only one color. FIG. 2A schematically illustrates the splicing principle of virtual images of an augmented reality display device according to an embodiment of the present disclosure. In this embodiment, a single pixel island may include red, green, and blue pixels, so that primary virtual images 205, 210, and 215 displayed by the single pixel island may be a full-color image. Secondary virtual images 220, 225, and 230 are formed after primary virtual images 205, 210, and 215 are magnified by the first optical elements 115. As shown in FIG. 2A, the virtual image light emitted by each pixel island forms a local virtual image (that is, a secondary virtual image) through the first optical element. Since the imaging element is disposed within the focal length of the first optical element, directions of the secondary virtual image and the primary virtual image remain unchanged. Local virtual images formed by any two adjacent pixel islands may be spliced. FIG. 2B schematically illustrates an optical path diagram of virtual image light emitted by an augmented reality display device according to an embodiment of the present disclosure. As shown in FIG. 2B, a virtual image light beam emitted by each imaging element 110 is directed through the first optical element 115, so that the primary virtual image displayed by each imaging element 110 is amplified to form a local virtual image and exits from the augmented reality display device, and the local virtual images are spliced together to form a complete virtual image. Pixels of a pixel island may be OLEDs, LCDs, Micro-LED, or the like.

Figure 3A:
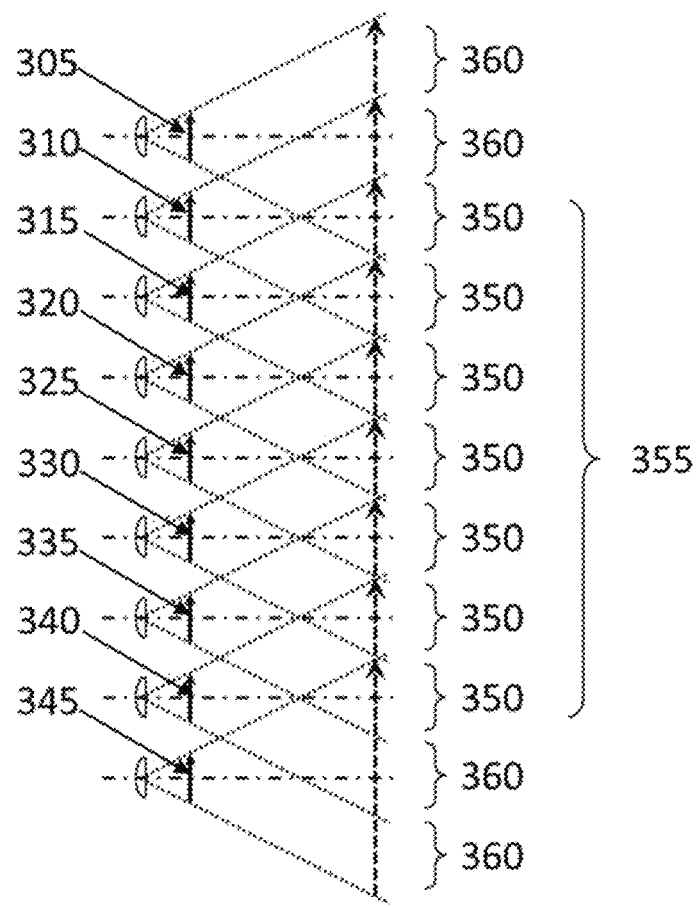
FIG. 3A schematically illustrates a splicing principle of virtual images of an augmented reality display device according to another embodiment of the present disclosure.

FIG. 3A schematically illustrates a splicing principle of virtual images of an augmented reality display device according to another embodiment of the present disclosure. In this embodiment, one pixel island includes only one color of pixels. The magnified secondary virtual image, which is obtained by magnifying the primary virtual image displayed by each monochrome pixel island can be spliced into a complete and magnified monochrome image. Specifically, primary virtual images 305, 320, and 335 are red images, primary virtual images 310, 325, and 340 are green images, and primary virtual images 315, 330, and 345 are blue images. As shown in FIG. 3A, three secondary virtual images of different colors are superposed in the full-color area 350. Therefore, the full-color area 350 may present a full-color pattern. All the full-color areas 350 form an effective display area 355. Each of the areas in the effective display area 355 is illuminated by light of three colors, so that the effective display area 355 can present a full-color virtual image. An area that is not covered by secondary virtual images of all three colors is a non-full-color area 360. If necessary, pixels corresponding to the non-full-color area 360 may not emit light, so that all parts of the displayed virtual images are full-colored. In this embodiment, local virtual images formed by pixel islands of the same color are spliced to form a monochrome complete virtual image. A plurality of monochrome complete virtual images of different colors are superposed to form a complete color virtual image.

The imaging elements may be arranged on a substrate in an appropriate manner to form an imaging element array. For example, imaging elements may be arranged in a rectangular array whose rows and columns are perpendicular to each other. In a case where a single imaging element is configured to emit a full-color local virtual image, secondary virtual images formed by every imaging elements are spliced, but are not overlapped. Therefore, a spacing between any adjacent imaging elements in each row may be equal, and a spacing between any adjacent imaging elements in each column may be equal.

In the case where a single imaging element emits a monochrome local virtual image, various imaging elements in each row and imaging elements in each column may be arranged at a same interval. A desired full virtual image can also be achieved by adjusting the secondary virtual image presented by each imaging element. Since the secondary virtual images generated by the imaging element needs to overlap, the spacing between imaging elements in each row and/or the spacing between imaging elements in each column may be shorter, as compared with the case where the imaging element emits the full-color local virtual image.

In some more specific embodiments, in an augmented reality display device, local virtual images formed by imaging elements located in the same row are partially overlapped, and local virtual images formed by imaging elements located in the same column are not overlapped. Meanwhile, the imaging elements in the same row are periodically arranged according to colors. For example, for imaging elements in the same row that emit light of three colors, the $(3N+1)^{th}$ imaging element may be configured to emit light of a first color, the $(3N+2)^{th}$ imaging element may be configured to emit light of a second color, and the $(3N+3)^{th}$ imaging element may be configured to emit light of a third color, where N is zero or a positive integer. Since in this embodiment, local virtual images formed by imaging elements located in the same row are partially overlapped, and local virtual images formed by imaging elements located in the same column are not overlapped, a spacing between adjacent imaging elements in the same row is different from a spacing between adjacent imaging elements in the same column. The imaging elements in the same column may emit light of the same color, or may emit light of different colors, and the imaging elements in the same column may not be periodically arranged according to colors. Based on such arrangement of monochromatic imaging elements, local monochromatic virtual images formed by the monochromatic imaging elements can be spliced and superposed to realize complete full-color virtual images.

It should be understood that terms "row" and "column" are used only to represent two lines perpendicular to each other in the above embodiments and do not limit extension directions of the lines in which the row and column are located. For example, in some embodiments, the term "row" may represent a horizontally extending line, and the term "column" may represent a vertically extending line; while in other embodiments, the term "row" may represent a vertically extending line, and the term "column" may represent a horizontally extending line.

Figure 3B:
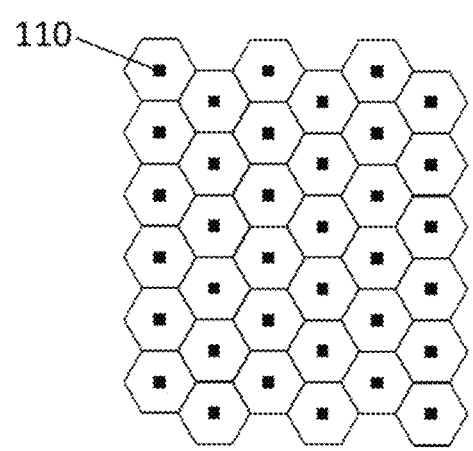
FIG. 3B schematically illustrates an arrangement of imaging elements of an augmented reality display device according to an embodiment of the present disclosure.
Figure 3C:
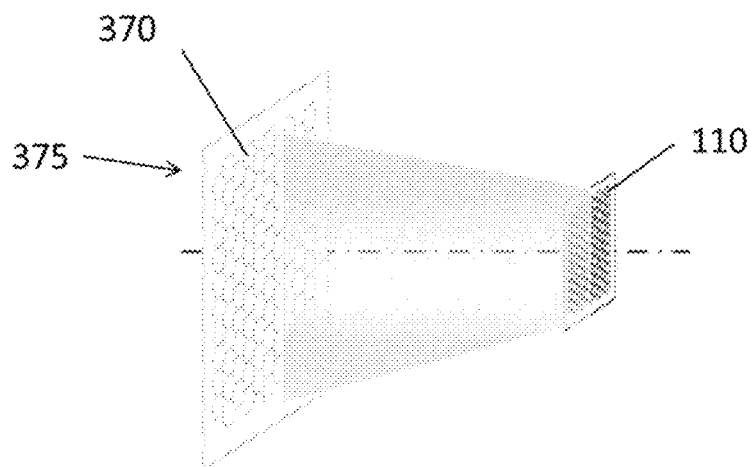
FIG. 3C schematically illustrates imaging of an augmented reality display device according to an embodiment of the present disclosure.

In addition to the rectangular array arrangement, the imaging elements may be arranged in other manners. For example, imaging elements may be arranged in hexagonal arrays. FIG. 3B schematically shows an arrangement of imaging elements, where the imaging elements are arranged in hexagons. Hexagonal arrays may be understood as arrays formed by the same hexagons that are closely arranged. The imaging element 110 may be located at the center of the hexagon. In an embodiment, three colors of imaging elements are included, different colors of imaging elements 110 are arranged at the center of each of three hexagons that share one vertex. A complete virtual pattern can be finally formed by adjusting the pattern of each imaging element. FIG. 3C schematically shows a schematic view of imaging of imaging elements arranged in a hexagonal manner. As shown in FIG. 3C, secondary virtual images 370 of a hexagon are formed through the imaging elements. These secondary virtual images 370 are spliced to form a full virtual image 375.

Although the first optical element 115 can present a secondary virtual image in the human eye, the first optical element 115 may also refract ambient light that is transmitted through the first optical element 115 and propagates towards the human eye, which makes it impossible to present a clear ambient image on the retina. In view of this, in some embodiments, the augmented reality display device further includes a second optical element 120. The second optical element 120 and the first optical element 115 form a lens assembly. The second optical element 120 is configured to correct ambient light transmitted through the first optical element 115 from the second side to the first side, i.e., enabling a focal length of the lens assembly to be positive infinity. That is, the second optical element 120 adjusts only the ambient light incident to the human eye and does not affect a virtual image emitted from the imaging element 110 to the human eye. For example, when ambient light enters the human eye through the substrate, some areas of the ambient image are often distorted due to the influence of the first optical element 115. Thus, by adding a second optical element 120 to the second side of the substrate, the second optical element 120 in combination with the first optical element 115 compensate for the distortion caused by the first optical element 115. In this way, the human eye can also see the generated secondary virtual image while viewing the external environment. The focal length of the lens assembly may be obtained by the following formula:

$$\frac{1}{f'} = \frac{1}{f_1'} + \frac{1}{f_2'} - \frac{d}{f_1' * f_2'},$$

where f' represents a focal length of the lens assembly, $f_1'$ represents a focal length of the first optical element, $f_2'$ represents a focal length of the second optical element, and d represents a distance between the second optical element 120 and the first optical element 115. In a more specific arrangement, both the imaging element 110 and the first optical element 115 are located on the same side of the second optical element 120. That is, the second optical element 120 is not located between the imaging element 110 and the first optical element 115. The second optical element 120 is further away from the human eye than the imaging element 110 and the first optical element 115. Thus, the virtual image light emitted by the imaging element 110 is directed to the human eye only by the first optical element 115 and is not affected by the second optical element 120.

Figure 4A:
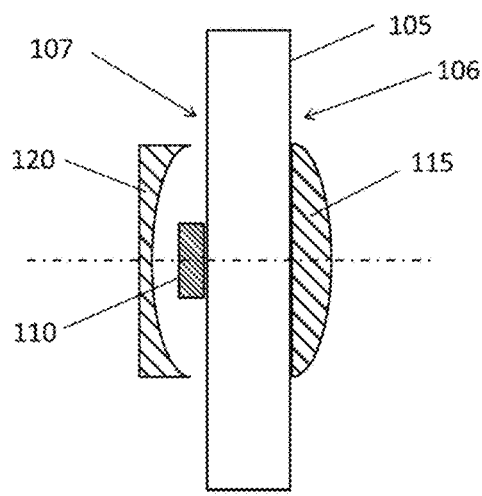
FIG. 4A schematically illustrates a partial cross-sectional view of an augmented reality display device according to an embodiment of the present disclosure.
Figure 4B:
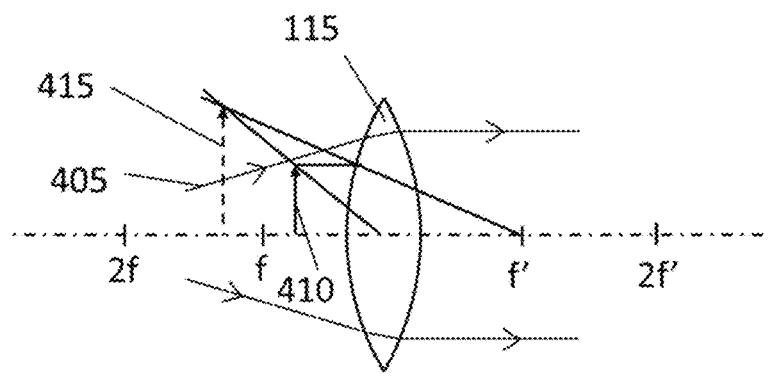
FIG. 4B schematically illustrates a principle of magnifying an image by a convex lens.

Types of the first optical element 115 and the second optical element 120 and a positional relationship with respect to the substrate 105 are described in detail below. The substrate 105 includes a first side and a second side opposite to each other. The first side may be a proximal eye side 106, that is, a side in both sides of the substrate 105 that is proximate to the eye. The second side may be a distal eye side 107, that is, a side in both sides of the substrate 105 that is distant from the eye. FIG. 4A schematically illustrates a partial cross-sectional view of an augmented reality display device according to an embodiment of the present disclosure. As shown in FIG. 4A, the first optical element 115 is located on the proximal eye side 106 of the substrate 105, and the imaging element 110 is located on the distal eye side 107 of the substrate 105. In some embodiments, at least one of the first optical element 115 or the imaging element 110 may be on the substrate 105 by way of bonding (for example, attaching). The imaging element 110 emits virtual image light in a direction from the distal eye side 107 to the proximal eye side 106. The second optical element 120 is located on the distal eye side 107 and is further away from the substrate 105 than the imaging element 110. FIG. 4B shows a principle of image magnifying of a convex lens. As shown in FIG. 4B, the primary virtual image 410 is located within a focal length of the convex lens. After passing through the convex lens, the primary virtual image 410 is magnified as the secondary virtual image 415 and remains in the same direction. Ambient light 405 is transmitted through the convex lens. The first optical element 115 is a convex lens or a converging metalens. The second optical element 120 is a concave lens or a diverging metalens. It should be understood that although the substrate 105 is located between the imaging element 110 and the first optical element 115 in the embodiment of FIG. 4A, the substrate 105 may also be located at other positions, for example, the imaging element 110, the first optical element 115, and the second optical element 120 may be disposed on the same side of the substrate. It should be understood that a direction defined by term such as "from the second side to the first side" or similar terms (e.g., from the distal eye side to the proximal eye side) is limited to be perpendicular to the substrate. In other words, the direction defined by these terms may not be perpendicular to the substrate.

The metalens is also an optical device, which has supernormal physical properties (such as negative permeability, negative dielectric constant, negative refractive index, etc.) that are not available in ordinary lens materials. The metalens can flexibly regulate an amplitude, a phase and a polarization of the incident light based on a two-dimensional planar structure formed by artificial atoms in a certain arrangement, which have special electromagnetic properties. When parallel light is incident on a scatter with a subwavelength, a phase of the light may change abruptly, that is, changes discontinuously. By arranging the scatters in one plane and accurately controlling the structure of each scatter to control the phase of the light, the parallel light may converge to a point or diverge. In other words, the phase change of the light may be the same as a phase change of the light after passing through a convex lens or a concave lens, that is, achieving the effect of the convex lens or the concave lens. Moreover, the metalens not only breaks through electromagnetic properties of the traditional materials, but also overcomes the difficulty of three-dimensional structure processing due to its two-dimensional planar structure, which facilitates integration and miniaturization of optical devices. Therefore, as a planar structure, the metalens can still realize functions of the traditional lens, and can also bring the effect of reducing an overall thickness of the display device. The diverging metalens is a metalens enabling parallel light to be dispersed after the parallel light is incident thereon, which can realize the effect of dispersing parallel light of a concave lens. The converging metalens is a metalens enabling parallel light to be converged after the parallel light is incident thereon, which can realize the effect of converging parallel light of a convex lens.

The virtual image light emitted by the imaging element 110 passes through the substrate 105 to reach the first optical element 115. The first optical element 115 magnifies the primary virtual image formed by the imaging element 110 and projects the primary virtual image to the human eye through the substrate 105, thereby causing the human eye to observe the secondary virtual image. The substrate 105 may be glass or other light-transmitting material. In some embodiments, the thickness of the substrate 105 may be proximate to the focal length of the first optical element 115 in a case that the thickness of the substrate 105 is smaller than the focal length, so as to achieve a better display effect. The first optical element 115 may have an effect on the ambient light passing through it and entering the human eye, which causes that the ambient light cannot exhibit a clear image on the retina. Thus, the aberration caused by the first optical element 115 may be corrected by the second optical element 120. An optical property of the second optical element 120 is opposite to that of the first optical element 115. Specifically, if the first optical element 115 is used to diffuse ambient light, the second optical element 120 is used to converge ambient light, and vice versa. Thus, the second optical element 120 can compensate for the distortion of the ambient light caused by the first optical element 115. Since the virtual image light emitted by the imaging element 110 transmits in a direction from the distal eye side 107 to the proximal eye side 106, and the second optical element 120 is farther from the substrate 105 than the imaging element 110, the second optical element 120 does not adversely affect the virtual image formed by the imaging element 110. In some embodiments, an optical axis of the first optical element 115 coincides with an optical axis of the second optical element 120, and the imaging element 110 is also located on the optical axis of the first optical element 115.

Figure 5A:
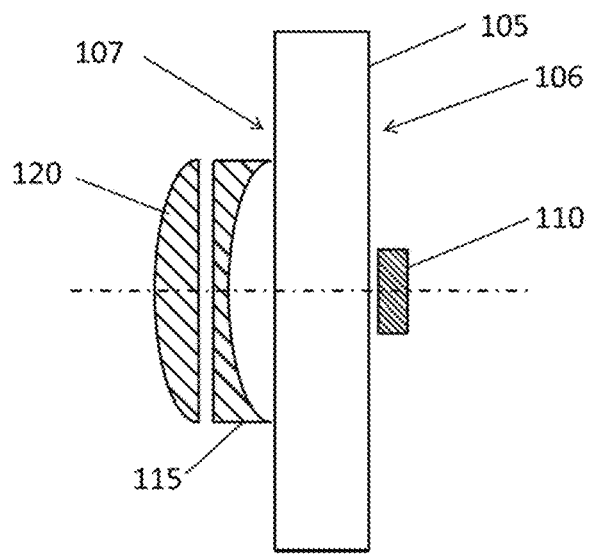
FIG. 5A schematically illustrates a partial sectional view of an augmented reality display device according to another embodiment of the present disclosure.
Figure 5B:
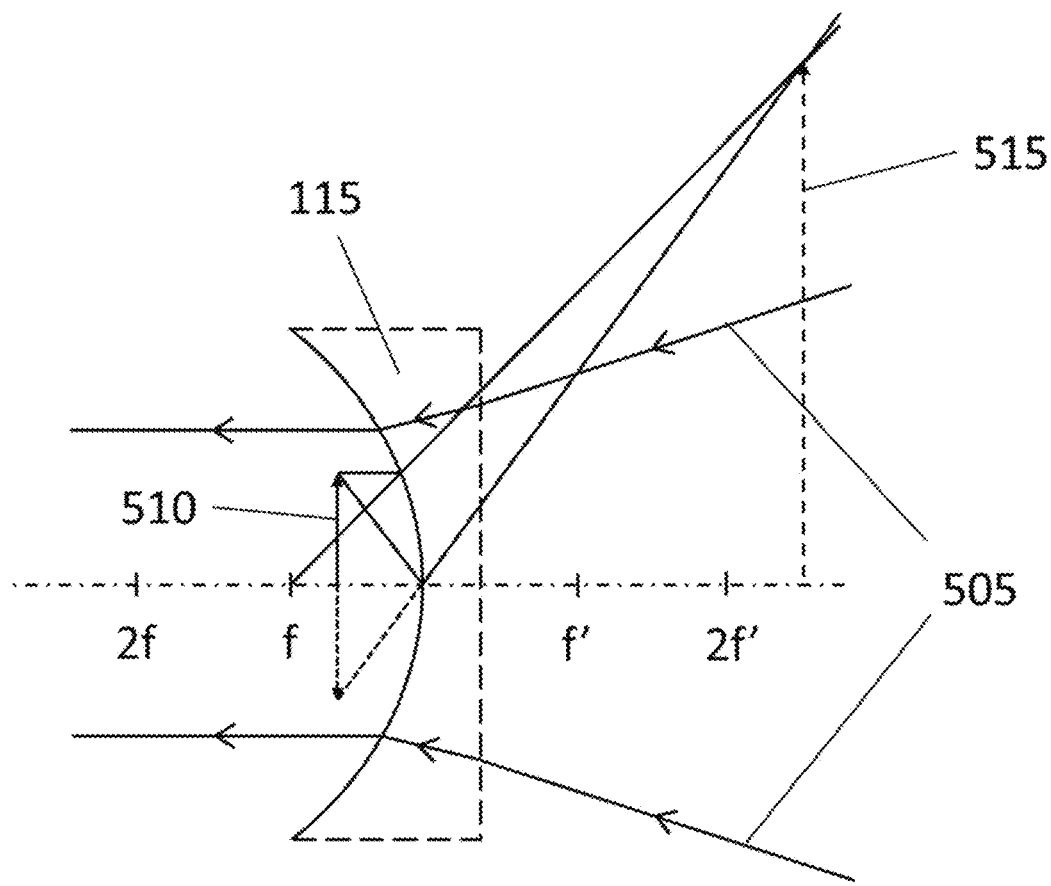
FIG. 5B schematically illustrates a principle of magnifying an image by a concave lens.

FIG. 5A schematically illustrates a partial sectional view of an augmented reality display device according to another embodiment of the present disclosure. As shown in FIG. 5A, the imaging element 110 is located on the proximal eye side 106 of the substrate 105, and the first optical element 115 is located on the distal eye side 107 of the substrate 105. The first optical element 115 may be a concave transflective lens including a concave reflective surface or a diverging metalens including a reflective surface. The concave transflective lens is a lens with both transmissive and reflective functions, the concave transflective lens is thin in the middle and is thick in the edges. The concave surface of the concave transflective lens faces the imaging element and is coated with a reflective film. The reflective film has a certain transmittance to allow ambient light to pass through it. In some embodiments, the transmittance ranges from 40% to 60%, and optionally, the transmittance is about 50%. The reflective film may be formed on concave surfaces by using common techniques such as deposition, plasma sputtering, and the like. FIG. 5B schematically illustrates an imaging principle of a concave lens. As shown in FIG. 5B, light emitted by an object located on a first side of the lens may be reflected by the lens to form an enlarged imaginary image. Light from a second side of the lens (e.g., ambient light 505) may be transmitted through the lens to the first side and may exit from the first side. A side of the first optical element 115 facing the imaging element 110 is a concave reflection surface. In some embodiments, the concave reflection surface is a parabolic surface, and the imaging element 110 is arranged near the focal plane of the concave reflection surface. The primary virtual image 510 formed by the imaging element 110 passes through the concave reflection surface of the concave transflective lens, and is reflected to the human eye through the substrate 105. The concave reflection surface amplifies the primary virtual image 510 to the secondary virtual image 515. Therefore, the concave transflective lens with the concave reflection surface is also able to magnify the virtual image and project the magnified image to the human eye. In addition, the concave transflective lens also has the transmission function. Ambient light can be transmitted through the concave transflective lens and through the substrate 105 to enter the human eye. The effect of a diverging metalens including a reflection surface is similar to that of a concave transflective lens including a concave reflection surface. By using a metalens, a virtual image formed by the imaging element 110 may be amplified and reflected to the human eye. The material of the metalens is selected from transparent materials so that the ambient light can enter the human eye through the metalens. Since the first optical element 115 may have an effect on ambient light passing through it and entering the human eye, the second optical element 120 is also provided on a side of the first optical element 115 away from the substrate 105. The light emitted by the imaging element 110 is reflected to the human eye by the first optical element 115 and does not pass through the second optical element 120, so that the second optical element 120 does not affect virtual images formed by the imaging element. The second optical element 120 may be a convex lens or a converging metalens used to converge ambient light, so as to compensate for the effect of the first optical element 115 on ambient light. It should be understood that although the substrate 105 in FIG. 5A is located between the imaging element 110 and the first optical element 115, the substrate 105 may also be located at other positions, such as the imaging element 110, the first optical element 115, and the second optical element 120 may be disposed on a same side of the substrate.

Figure 6A:
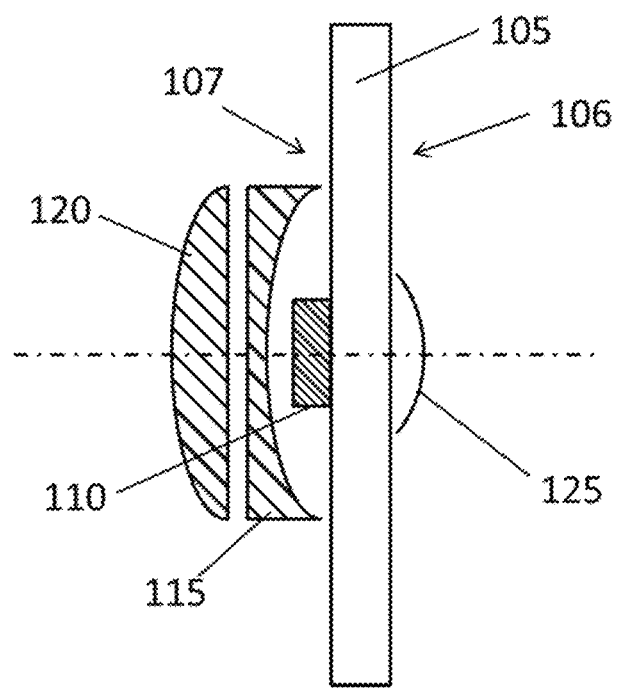
FIG. 6A schematically illustrates a partial cross-sectional view of an augmented reality display device according to another embodiment of the present disclosure.
Figure 6B:
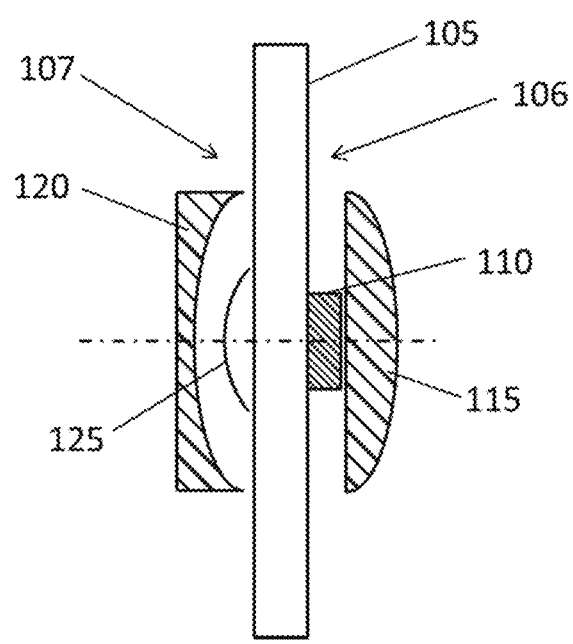
FIG. 6B schematically illustrates a partial cross-sectional view of an augmented reality display device according to yet another embodiment of the present disclosure.

FIG. 6A schematically illustrates a partial sectional view of an augmented reality display device according to another embodiment of the present disclosure. FIG. 6B schematically illustrates a partial sectional view of an augmented reality display device according to yet another embodiment of the present disclosure. In these embodiments, the augmented reality display device still includes an imaging element 110, a first optical element 115, and a second optical element 120. The augmented reality display device further includes a third optical element 125. The imaging element 110 and the first optical element 115 are disposed on a same side of the substrate 105. The imaging element 110 is closer to the substrate 105 than the first optical element 115. The third optical element 125 and the first optical element 115 are located on different sides of the substrate 105. The third optical element 125 includes a hyperbolic reflective surface facing the imaging element 110. The imaging element 110 is arranged at a focal plane of the third optical element 125, and according to imaging characteristics of the hyperbolic surface, light exiting from the hyperbolic surface is equivalent to light emitted by an imaging element arranged at another focal point of the hyperbolic surface. Based on this arrangement, the thickness of the substrate 105 can be reduced. Distances among the imaging element, the hyperbolic reflective surface and the concave reflective surface of the concave transflective lens should satisfy that: the sum of the focal length of the hyperbolic reflective surface and a distance between the hyperbolic reflective surface and the concave reflective surface of the concave transflective lens should be smaller than the focal length of the concave reflective surface. These distances may be formed by filling some transparent materials between these elements. In the embodiment of FIG. 6A, the first optical element 115 is a concave transflective lens having a concave reflection surface or a diverging metalens having a reflection surface, and the second optical element 120 is a convex lens or a converging metalens. The imaging element 110 is located on the distal eye side 107 of the substrate and is configured to emit virtual image light in a direction from the distal eye side 107 to the proximal eye side 106. The first optical element 115 is also located on the distal eye side 107 of the substrate 105, and is farther away from the substrate 105 than the imaging element 110. The third optical element 125 has a reflection surface, and may be configured to reflect virtual image light from the imaging element 110 to the first optical element 115 through the substrate 105. Specifically, the third optical element 125 may be a reflective lens including a concave reflective surface. In some embodiments, the concave reflective surface of the third optical element 125 is a hypersurface, and the imaging element 110 is located on a focal plane of the hypersurface. The first optical element 115 is configured to amplify the primary virtual image reflected by the third optical element 125, and reflect the amplified primary virtual image to the human eye. The sum of a distance from the imaging element 110 to the third optical element 125 and a distance from the third optical element 125 to the reflection surface of the first optical element 115 is as close to the focal length as possible when it is less than the focal length of the reflection surface of the first optical element 115. Such arrangement may be achieved by filling a transparent material between the imaging element 110 and the first optical element. The second optical element 120 still has a function of compensating for the influence of the first optical element 115 on ambient light. In the embodiment of FIG. 6B, the first optical element 115 is a convex lens or a converging metalens, and the second optical element 120 is a concave lens or a diverging metalens. The imaging element 110 and the first optical element 115 are disposed on the first side 106 of the substrate 105. The third optical element 125 and the second optical element 120 are disposed on the second side 107 of the substrate 105. The virtual image light emitted by the imaging element 110 is reflected by the third optical element 125, and is further projected to the first optical element 115, and a secondary virtual image is formed through the first optical element 115. The distance from the imaging element 110 to the third optical element 125 and the distance from the third optical element 125 to the first optical element 115 are as close as possible to the focal length when they are smaller than the focal length of the first optical element 115. Because of the presence of the third optical element 125, when an optical path from the imaging element 110 to the first optical element 115 remains unchanged, the substrate 105 becomes thinner, which is more advantageous to lightening the device.

It should be understood that although device types that may be used specifically as imaging elements 110, first optical elements 115, second optical elements 120, third optical elements 125 are provided in the above embodiments, the present disclosure is not limited to these specific types. As an example, while in some embodiments a lens or a metalens is used as an optical element, it should be understood that any optical device capable of amplifying a virtual image of the imaging element 110 and projecting the virtual image to a human eye can be used as the first optical element 115. Any optical device that allows ambient light to be transmitted to the human eye and compensates for the impact of the first optical element 115 on ambient light can be used as the second optical element 120.

The magnified virtual image may need to be converged to the human eye, which depends on a distance between the augmented reality display device and the human eye, such as near-eye display. For this purpose, in some embodiments, as shown in FIG. 1, the imaging element 110, the first optical element 115, and the second optical element 120 are located on a curved substrate, and by adjusting parameters such as the thickness and curvature of the curved substrate, a light-exiting angle of the first optical element 115 may be adjusted to converge the amplified virtual image. The term "curved substrate" refers to a substrate that carries imaging elements being curved. The substrate is curved and functions to adjust positions and angles of the first optical element 115 (such as a lens or a metalens), the second optical element 120, and the pixel island, so as to make the image light incident on the human eye have a good imaging quality. The light emitted from a pixel island is amplified by the first optical element 115 and then enters into the human eye. Since the first optical element 115 is attached to a curved substrate (such as a curved glass substrate), an image of a single pixel island viewed by a human eye is light in a tiny viewing field emitted by pixels and limited within a lens paraxial region (the pixel island is at the center of the lens). As a result, the imaging quality is greatly improved while an entire image is viewed by the human eye.

In addition, although the first optical elements 115 and the second optical elements 120 are respectively in one-to-one correspondence with the imaging elements 110, various first optical elements 115 are not necessarily spatially independent. That is, the first optical elements 115 on the substrate 105 may be implemented as different parts of an entire layer structure, each of the parts corresponds to one imaging element 110, and respective optical properties of these parts are correspondingly set for the respective imaging elements.

Figure 7:
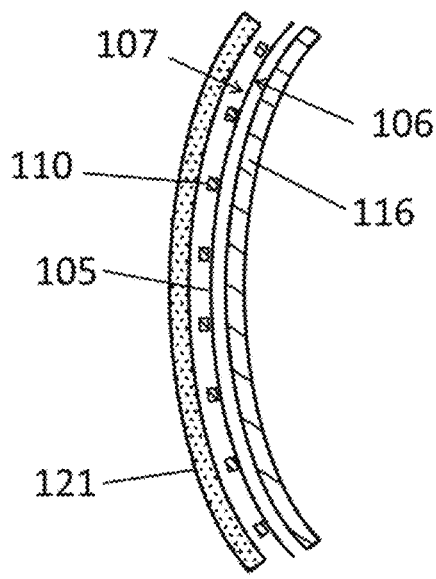
FIG. 7 schematically illustrates a structure of an augmented reality display device according to another embodiment of the present disclosure.

It may also be understood that all the first optical elements 115 are connected to form a first optical layer. FIG. 7 schematically illustrates a structure of an augmented reality display device according to another embodiment of the present disclosure. As shown in FIG. 7, the augmented reality display device includes a first optical layer. The first optical layer includes a first free-form-surface lens 116. The first free-form-surface lens 116 is located a side of the substrate 105 near the eye. In this case, a whole piece of the first free-form-surface lens 116 replaces all the first optical elements 115. That is, the primary virtual image formed by each imaging element 110 is amplified by a segment of the corresponding first free-form-surface lens 116 and is projected to the human eye, that is, the first free-form-surface lens 116 has positive focal power. The first free-form-surface lens 116 is configured to modulate light beams at different positions to enable secondary virtual images formed by the imaging elements 110 to be finally incident into the human eye. Since distortion occurs after the ambient light is transmitted through the first free-form-surface lens 116, a whole of a second optical layer (for example, a second free-form-surface lens 121) with negative focal power may be provided on a side of the substrate 105 away from the eye for optical compensation. In this way, ambient light can enter into the human eye without distortion. While observing the surrounding environment, the human eye can also obtain the secondary virtual image to realize the near-eye projection display. The first free-form-surface lens may be attached directly to the substrate. The second free-form-surface lens may cover the imaging elements and be attached to the substrate by means of a transparent material.

Figure 8A:
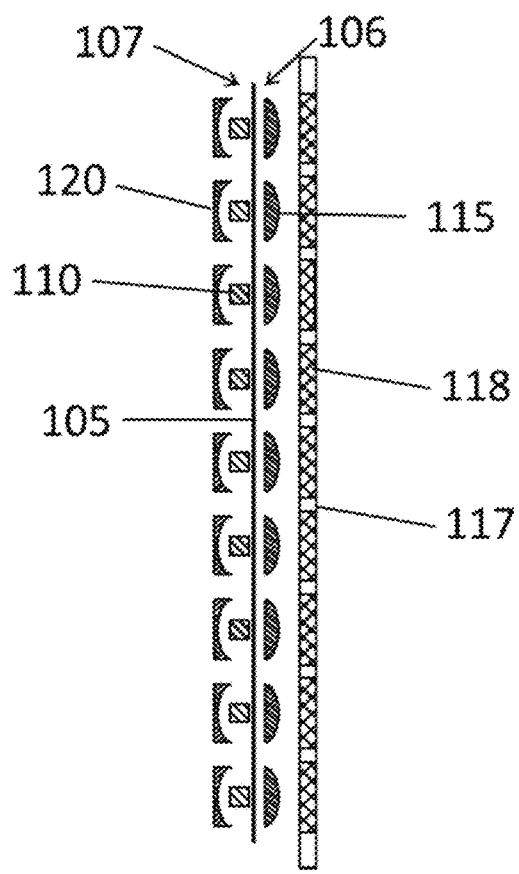
FIG. 8A schematically illustrates a structure of an augmented reality display device according to yet another embodiment of the present disclosure.
Figure 8B:
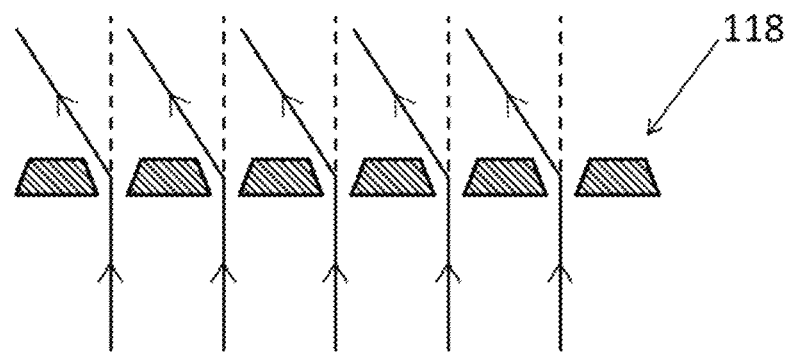
FIG. 8B schematically shows a principle of a transmissive diffraction grating.

FIG. 8A schematically illustrates a structure of an augmented reality display device according to another embodiment of the present disclosure. As shown in FIG. 8A, the substrate 105 may be a planar substrate. The imaging elements 110 are located on a far-eye side of the substrate 105, and the first optical elements 115 are located on a near-eye side of the substrate 105. A planar volume holographic grating 117 is further disposed on a side of the first optical element 115 is away from the substrate 105. FIG. 8B schematically shows the principle of a transmissive diffraction grating. As shown in FIG. 8B, a beam of parallel light changes its propagating direction after passing through the volume holographic grating 117 to project in a direction of the human eye. According to the planar grating equation $$n_2 * \sin\varphi - n_1 * \sin\theta = \frac{j*\lambda}{d},$$

, a period of the planar grating can be set to adjust a diffraction angle according to an incident angle, where $n_2$ represents the refractive index of the medium in which the incident light is located, and $n_1$ represents the refractive index of the medium in which the diffraction light is located, that is, $n_2$ and $n_1$ depend on the medium arranged before and after the planar grating; $\Phi$ represents the incident angle, $\theta$ represents the diffraction angle, d represents the grating period, j represents the number of diffractions of light in the grating, and j=±1, 2, 3 . . . . The planar volume holographic grating 117 includes several sub-gratings 118. Depending on positions of imaging elements 110 corresponding to respective sub-grating 118, the sub-gratings 118 have different periods or grating vector directions. These sub-gratings 118 at different positions diffract the light transmitted through the first optical element 115, so that the light deflects. By specifically designing various sub-gratings 118 at different positions, light can be transmitted in a predetermined direction, and finally a virtual image is converged to a human eye observation area (Eye Box) to form an amplified and spliced image at the human eye retina. The augmented reality display device including the planar volume holographic grating 117 can have a corresponding effect of the curved substrate (for example, improving the image quality), and the augmented reality display device is smaller and lighter than the augmented reality display device including the curved substrate.

Figure 9A:
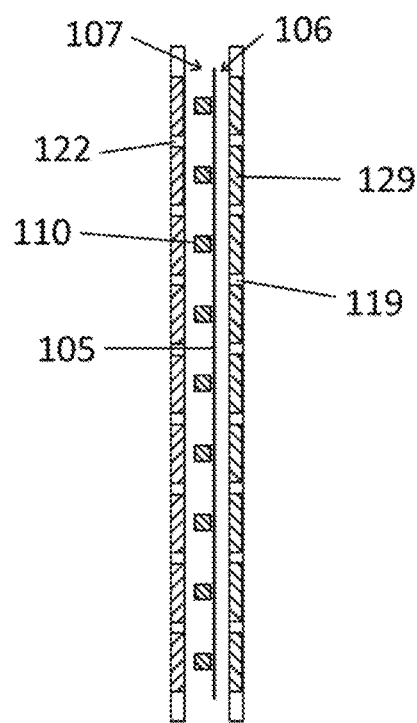
FIG. 9A schematically illustrates a structure of an augmented reality display device according to yet another embodiment of the present disclosure.
Figure 9B:
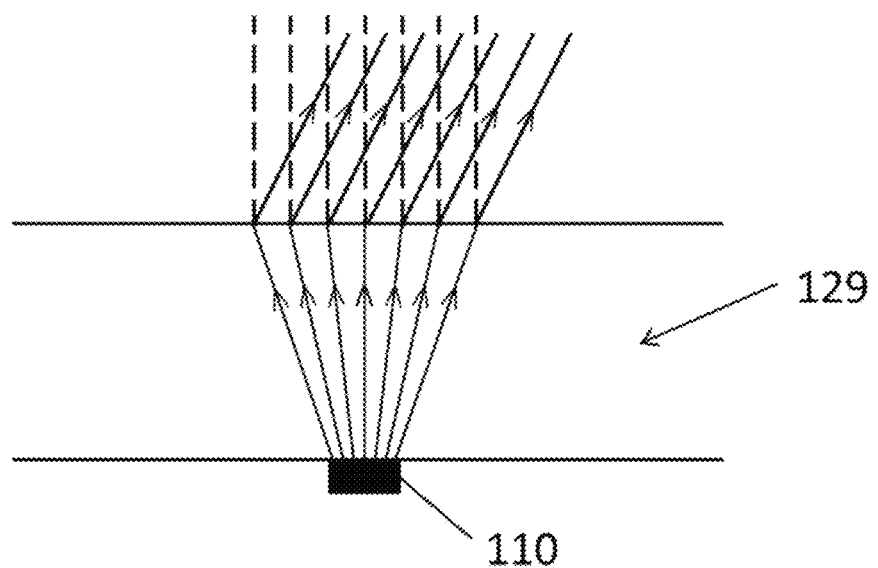
FIG. 9B schematically illustrates an imaging principle of a holographic lens.

FIG. 9A schematically illustrates a structure of an augmented reality display device according to yet another embodiment of the present disclosure. As shown in FIG. 9A, first optical elements in the augmented reality display device are connected to form a first optical layer, and the first optical layer includes a holographic lens. A holographic lens layer 119 is provided on the proximal eye side 106 of the substrate 105. FIG. 9B schematically illustrates the imaging principle of a holographic lens. The planar holographic lens has two main functions: one function is to realize plane wave convergence of a plane lens without spherical aberration, simulate a difference between a light path from each part of the lens to the focus point and a light path of the central light, and compensate a phase delay caused by the difference; the other function is to realize the deflection of imaging paths of the plane lens, add phase distribution of a grating on the basis of the phase of the lens, and convert off-axis imaging of a large viewing field into paraxial and small-angle imaging of a single holographic lens. The holographic lens layer 119 includes a plurality of holographic lens structures 129. Each holographic lens structure 129 is specifically designed for a corresponding imaging element 110. The imaging element 110 is proximate to a focal plane of the holographic lens structure 129, so that a primary virtual image formed by the imaging element 110 forms a positive secondary virtual image at a distance of distinct vision from the human eye. Each of the holographic lens structures 129 in the holographic lens layer 119 is specially designed to form different off-axis holograms and is configured to refract light in the direction of the human eye. In this way, the light emitted by the imaging elements at different locations eventually converges to the human eye. The holographic structure can realize the off-axis imaging of a large field of view. Therefore, the display device can realize the planarization and a simply structure, so as to reduce the volume of the device and make the device easy to be processed. A compensation holographic lens layer 122 is provided on the distal eye side 107 of the substrate 105, which may compensate for the effect of the holographic lens layer 119 on the natural light incident on the human eye.

As compared with the related art, in some embodiments of the present disclosure, a light source is directly integrated onto a display device to realize high light efficiency and ultra-thin display with a direct projection of the light source. In some embodiments, the schemes may be applied to near-eye displays, and may also be applied to long-distance, large and transparent screen projection displays. In some embodiments, the schemes of the present application may correct vergence-accommodation conflict (VAC), myopia, astigmatism, hyperopia, presbyopia of the human eyes, and the like.

It should be understood that in the above descriptions of the free-form-surface lens, the planar volume holographic grating, and the holographic lens layer, an imaging element, a magnification optical element for magnifying the virtual image formed by the imaging element, and a compensation optical element are arranged in a manner that the imaging element is located on a side of the substrate away from the eye, the magnification optical element is located on a side of the substrate near the eye, and the compensation optical element is located on the side of the substrate away from the eye, and is farther from the imaging element than the imaging element. The light path effect is similar to that of FIG. 4B. However, the imaging element, the amplification optical element, and the compensation optical element may also be arranged in the manner shown in FIG. 5A, that is, the imaging element is located on the side of the substrate near the eye, the amplification optical element is located on the side of the substrate away from the eye, and is configured to reflect a virtual image emitted by the imaging element to the human eye, and the compensation optical element is located on the side of the substrate away from the eye and is farther from the amplification optical element than the substrate. In addition, the third optical element is not excluded.

According to another aspect of the present disclosure, a pair of augmented reality glasses is provided, which includes the augmented reality display device according to the embodiments of the present disclosure.

In conclusion, the present disclosure provides an augmented reality display device and a pair of augmented reality glasses. The augmented reality display device includes a substrate, an imaging element, and a first optical element. The imaging element is configured to provide display information transmitted through the substrate. The first optical element is configured to receive the display information and form an enlarged image of the display information on a first side of the substrate.

The augmented reality display device according to the present disclosure projects directly the light to a human eye through several imaging elements attached to a transparent substrate. Primary virtual images displayed by the imaging elements are magnified and oriented by a magnification optical element to form a complete virtual image on the retina of the human eye after being spliced. The imaging elements with a small size can't be observed clearly by human eyes, and the brightness of the imaging elements can be fused with the ambient light through a proper pixel rendering algorithm, thereby not affecting the observation of the external environment. In addition, compensation optical elements are provided to compensate the influence of magnification optical elements on ambient light, so as not to affect normal viewing of external scenes. Thus, the ambient light can pass through the augmented reality display device without distortion into the human eye. In the augmented reality display device, a display panel and an optical path reversal system in the related technology are omitted, light-emitting elements such as LED and OLED are directly used to provide images, which reduces the loss of light energy in the process of a light beam propagating. The augmented reality display device in the present disclosure has a simple structure, a low processing difficulty, and a low cost. In the present disclosure, an external image source (e.g., projector, OLED, L-cos, etc.) in the augmented reality technique of the related art is integrated onto a lens, so that the device is light, thin, and has a low cost. At the same time, the processing difficulty and the cost can be reduced because the micro-grating structure is not included. Compared with the transparent display technology in the related art, the augmented reality display device in the present disclosure has characteristics of being lighter and thinner, and having a higher light efficiency and a higher application value.

It may be appreciated that the above embodiments are described only by way of example. Although embodiments have been illustrated and described in detail in the drawings and the foregoing descriptions, such illustrations and descriptions may be considered illustrative or exemplary and non-restrictive, and the present disclosure is not limited to the disclosed embodiments. In addition, it should be understood that the elements in the drawings of the present application are not necessarily drawn proportionally, and the dimensions shown in the drawings do not represent actual or relative dimensions of the elements.

By studying the drawings, the disclosed content and the appended claims, those skilled in the art may understand and reach other variations to the disclosed embodiments when practicing the claimed invention. In the claims, the word "include" does not exclude other elements or steps, and the indefinite article "a" or "an" does not exclude plural. The mere fact that certain measures are enumerated in different dependent claims does not mean that the combination of these measures cannot be used for profit. No reference numeral shall be construed as limiting in scope. The word such as first, second, third, or similar words does not represent a sort of order, which may be interpreted as names. The drawings only schematically show the arrangement order of elements in some embodiments, and do not limit a distance between the elements.

The invention claimed is:

1. An augmented reality display device, comprising: a substrate, an imaging element and a first optical element, wherein, the substrate comprises a first side and a second side opposite to each other;

the imaging element is configured to display a primary virtual image formed by virtual image light;

the first optical element is located on the first side or the second side of the substrate, and configured to receive the virtual image light, orient the virtual image light to magnify the primary virtual image into a secondary virtual image, and make the virtual image light exit from the first optical element in a direction from the second side to the first side;

the augmented reality display device further comprises a second optical element, the second optical element is on the second side of the substrate, the imaging element and the first optical element are located on a same side of the second optical element, and the second optical element is configured to correct ambient light transmitted through the first optical element in a direction from the second side to the first side;

the augmented reality display device further comprises a third optical element on the second side of the substrate, the imaging element and the first optical element are on the first side of the substrate, the imaging element is closer to the substrate than the first optical element, and the third optical element is closer to the substrate than the second optical element; and the first optical element is a convex lens or a converging metalens, the second optical element is a concave lens or a diverging metalens, and the third optical element comprises a reflective surface facing the imaging element.

2. The augmented reality display device according to claim 1, wherein the first optical element is located on the first side of the substrate, and the imaging element is located on the second side of the substrate, and is closer to the substrate than the second optical element; and wherein the first optical element is a convex lens or a converging metalens, and the second optical element is a concave lens or a diverging metalens.

3. The augmented reality display device according to claim 1, wherein the imaging element is located on the first side of the substrate, the first optical element is located on the second side of the substrate, and is closer to the substrate than the second optical element; and wherein the first optical element comprises a concave transflective lens comprising a concave reflective surface that faces the imaging element, or a diverging metalens comprising a reflective surface that faces the imaging element, and the second optical element comprises a convex lens or a converging metalens.

4. The augmented reality display device according to claim 1, wherein gaps are between a plurality of imaging elements, and each of the gaps is configured to allow ambient light to pass through.

5. The augmented reality display device according to claim 1, wherein an optical axis of each of a plurality of first optical elements passes through a geometric center of the primary virtual image formed by a corresponding one of a plurality of imaging elements.

6. The augmented reality display device according to claim 1, wherein the substrate is a curved substrate, a plurality of first optical elements are spaced apart from each other on the curved substrate, and the curved substrate is configured to adjust light-exiting angles of a plurality of first optical elements to converge a plurality of secondary virtual images.

7. The augmented reality display device according to claim 1, wherein the substrate is a curved substrate, a plurality of first optical elements are connected to form a first optical layer, and the first optical layer comprises a free-form-surface lens.

8. The augmented reality display device according to claim 1, wherein the substrate is a planar substrate, a plurality of first optical elements are spaced apart from each other on the planar substrate, the augmented reality display device further comprises a volume holographic grating, and the volume holographic grating is located on a side of the first optical element away from the substrate.

9. The augmented reality display device according to claim 8, wherein the volume holographic grating comprises a plurality of sub-gratings, an optical axis of each of the plurality of sub-gratings coincides with an optical axis of a corresponding one of the plurality of first optical elements, and the volume holographic grating is configured to converge a plurality of secondary virtual images.

10. The augmented reality display device according to claim 1, wherein the substrate is a planar substrate, a plurality of first optical elements are connected to form a first optical layer, and the first optical layer comprises a holographic lens.

11. The augmented reality display device according to claim 1, wherein the imaging element is a pixel island, the pixel island comprises a plurality of pixels, and the pixel islands are arranged at intervals on the substrate.

12. The augmented reality display device according to claim 11, wherein each of the pixel islands comprises a plurality of pixels of different colors.

13. The augmented reality display device according to claim 12, wherein a plurality of secondary virtual images respectively emitted by the plurality of pixel islands are spliced into a complete virtual image.

14. The augmented reality display device according to claim 11, wherein the pixel island comprises a plurality of pixels of a same color.

15. The augmented reality display device according to claim 14, wherein secondary virtual images formed by the adjacent pixel islands with different pixel colors at least partially overlap.

16. The augmented reality display device according to claim 15, wherein secondary virtual images of a same color emitted by the pixel islands of a same color are spliced to each other, and secondary virtual images of different colors emitted by the pixel islands of different colors are superposed to form a complete virtual image.

17. A pair of augmented reality glasses, comprising the augmented reality display device according to claim 1.

18. An augmented reality display device, comprising: a substrate, an imaging element and a first optical element, wherein, the substrate comprises a first side and a second side opposite to each other;

the imaging element is configured to display a primary virtual image formed by virtual image light;

the first optical element is configured to receive the virtual image light, orient the virtual image light to magnify the primary virtual image into a secondary virtual image, and make the virtual image light exit from the first optical element in a direction from the second side to the first side;

the augmented reality display device further comprises a second optical element, the second optical element is on the second side of the substrate, the imaging element and the first optical element are located on a same side of the second optical element, and the second optical element is configured to correct ambient light transmitted through the first optical element in a direction from the second side to the first side;

the augmented reality display device further comprises a third optical element, wherein the third optical element is on the first side of the substrate, the imaging element and the first optical element are on the second side of the substrate, the imaging element is closer to the substrate than the first optical element, and the first optical element is closer to the substrate than the second optical element; and the first optical element comprises a concave transflective lens comprising a concave reflective surface, or a diverging metalens comprising a reflective surface, the second optical element comprises a convex lens or a converging metalens, and the third optical element comprises a reflective surface facing the imaging element.

19. The augmented reality display device according to claim 18, wherein the first optical element is located on the first side of the substrate, and the imaging element is located on the second side of the substrate, and is closer to the substrate than the second optical element; and wherein the first optical element is a convex lens or a converging metalens, and the second optical element is a concave lens or a diverging metalens.

20. The augmented reality display device according to claim 18, wherein the imaging element is located on the first side of the substrate, the first optical element is located on the second side of the substrate, and is closer to the substrate than the second optical element; and wherein the first optical element comprises a concave transflective lens comprising a concave reflective surface that faces the imaging element, or a diverging metalens comprising a reflective surface that faces the imaging element, and the second optical element comprises a convex lens or a converging metalens.

* * * * *